United States Patent
Babcock et al.

(10) Patent No.: US 7,346,447 B1
(45) Date of Patent: Mar. 18, 2008

(54) ENGINE KNOCK CONTROL FOR TURBOCHARGED ENGINES

(75) Inventors: Douglas J. Babcock, Dexter, MI (US); Richard M. Backman, Sodertalje (SE); Emil Ritzen, Gunnebo (SE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/684,920

(22) Filed: Mar. 12, 2007

(51) Int. Cl.
*G06F 19/00* (2006.01)
*G01L 23/22* (2006.01)

(52) U.S. Cl. .................................. 701/111; 73/35.03
(58) Field of Classification Search ............... 701/111, 701/102, 101, 115; 73/35.03; 123/406.33
See application file for complete search history.

(56) References Cited

U.S. PATENT DOCUMENTS

| | | | |
|---|---|---|---|
| 4,111,035 A | * | 9/1978 | West et al. ................ 73/35.05 |
| 4,364,260 A | * | 12/1982 | Chen et al. ............... 73/35.03 |
| 5,090,382 A | | 2/1992 | Bolander et al. |
| 5,560,337 A | | 10/1996 | Bolander et al. |

* cited by examiner

*Primary Examiner*—Hieu T. Vo

(57) ABSTRACT

An engine knock control system for an engine having a turbocharger includes a first module that determines octane scalars indicative of an engine knock propensity for each cylinder of the engine system and a second module that determines a cylinder air mass limit based on the octane scalars. A third module limits a boost output of the turbocharger based on the cylinder air mass limit.

15 Claims, 4 Drawing Sheets

ENGINE KNOCK CONTROL FOR TURBOCHARGED ENGINES

FIELD OF THE INVENTION

The present invention relates to internal combustion engines, and more particularly to knock control in a turbocharged engine.

BACKGROUND OF THE INVENTION

Internal combustions engines combust an air and fuel (A/F) mixture within cylinders to produce drive torque. More specifically, the combustion events reciprocally drive pistons that drive a crankshaft to provide torque output from the engine. The A/F mixture is ignited or sparked at a desired crank angle. In some instances, however, the A/F mixture ahead of the flame-front auto-ignites within the cylinder resulting in undesired engine knock.

Accordingly, engine knock control systems have been developed to detect and to mitigate engine knock. One such engine knock control system is disclosed in U.S. Pat. No. 5,560,337, entitled Knock Control Using Fuzzy Logic, and issued on Oct. 1, 1996. Such traditional systems detect the propensity for a particular cylinder to auto-ignite and retard the cylinder spark timing to avoid engine knock. Although engine knock is avoided, exhaust gas temperatures increase as a result of the retarded spark timing.

Some internal combustion engines include a turbocharger, which increases the charge air density ingested by the engine. The turbocharger is driven by the exhaust gas, whereby the heat energy of the exhaust gas is transformed into mechanical energy to compress the air entering the engine. In turbocharged engines, engine knock will occur at high loads, especially when a low octane (e.g., 85 octane) fuel is used. Consequently, a persistent knock condition can occur.

Traditional engine knock control systems do not sufficiently mitigate engine knock when applied in a boosted internal combustion engine. More specifically, traditional engine knock control systems retard spark in order to mitigate engine knock. However, spark retard results in higher exhaust temperatures, which in turn result in increased boost of the turbocharger (i.e., higher temperatures means higher heat energy, which results in increased turbocharger boost). Consequently, engine knock actually increases as a result of spark retard. Accordingly, the spark retard is continuously increased until the spark retard authority is fully consumed.

SUMMARY OF THE INVENTION

Accordingly, the present invention provides an engine knock control system for an engine including a turbocharger. The engine knock control system includes a first module that determines octane scalars indicative of an engine knock propensity for each cylinder of the engine system and a second module that determines a cylinder air mass limit based on the octane scalars. A third module limits a boost output of the turbocharger based on the cylinder air mass limit.

In another feature, the cylinder air mass limit is determined based on a maximum of the octane scalars.

In another feature, the cylinder air mass limit is further determined based on an engine RPM.

In still another feature, the engine knock control system further includes a fourth module that determines a spark retard for each cylinder respectively based on the octane scalars.

In yet another feature, the third module limits a boost output of the turbocharger by actuating a waste gate valve to selectively detour an exhaust gas from entering the turbocharger.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
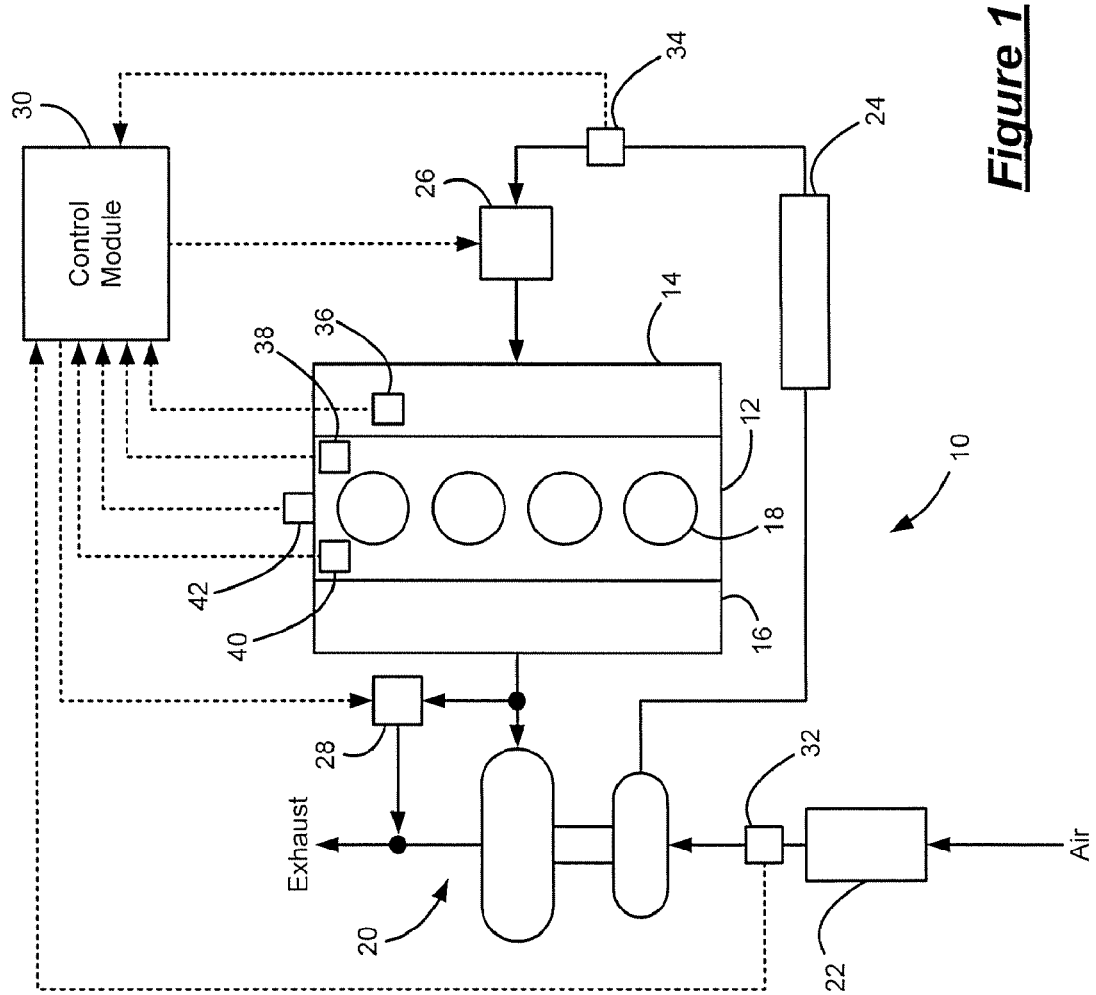
FIG. 1 is a functional block diagram of an engine system including a turbo charger.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an exemplary engine system 10 is illustrated. The engine system 10 includes an engine 12 having an intake manifold 14 and an exhaust manifold 16. Air and fuel are mixed and the air/fuel mixture is combusted within cylinders 18 of the engine 12. Although the exemplary engine illustrated in FIG. 1 includes 4 cylinders, it is anticipated that the engine can include more or fewer cylinders. For example, engines having 2, 3, 5, 6, 8, 10 and 12 cylinders are anticipated.

The engine system 10 further includes a turbocharger 20. Exhaust gas exiting the exhaust manifold drives the turbocharger 20, which compresses air that is drawn into the engine from atmosphere through an air filter 22 and an air cooler 24. The compressed air is metered into the intake manifold 14 through a throttle 26. The turbocharger 20 further includes a waste gate 28 that is actuated to detour the exhaust gas exiting the exhaust manifold 16. More specifically, the exhaust gas can be selectively detoured such that it does not drive the turbocharger 20. In this manner, the amount of boost provided by the turbocharger 20 can be regulated.

A control module 30 regulates operation of the engine system 10 based on the turbocharged engine knock control of the present invention. More specifically, the control module 30 regulates operation of the throttle 26 and the waste gate 28 of the turbocharger 20 based on a plurality of engine operating parameters. A mass air flow (MAF) sensor 32 generates a MAF signal based on the air flow into the engine system 10 and an intake air temperature sensor 34 generates a signal based on the temperature of the intake air ($T_{IA}$). A manifold absolute pressure (MAP) sensor 36 generates a MAP signal and an engine temperature sensor 38 generates a signal based on an engine temperature ($T_{ENG}$). $T_{ENG}$ can be based on the temperature of a coolant flow through the engine system 10. An engine speed sensor 40 generates an RPM signal based on the rotational speed of a crankshaft (not shown).

An engine knock sensor 42 is provided and can include any vibration sensor or other sensor known in the art to produce a signal based on a knock related engine parameter. For example, a sensor that senses engine vibration within a predetermined frequency range is anticipated. A knock count $C_{KNOCK}$ is generated based on the signal of the engine knock sensor 42, and includes a counter value that is periodically cleared and that is incremented upon identification of a sensed knock event or condition. It is also anticipated that a knock processor (not shown) can be implemented to reduce signal noise.

The turbocharged engine knock control of the present invention is partially based on the engine knock control disclosed in U.S. Pat. No. 5,560,337, entitled Knock Control Using Fuzzy Logic, and issued on Oct. 1, 1996, the disclosure of which is expressly incorporated herein by reference. More specifically, the turbocharged engine knock control determines a knock propensity value or octane scalar for each cylinder 18 of the engine 12. The octane scalar varies between 0 and 1. A value of 0 indicates no propensity to knock and a value of 1 indicates a very high propensity to knock. A maximum air mass per cylinder is determined based on the octane scalars and the maximum boost of the turbocharger 20 is limited such that the maximum air mass per cylinder is not exceeded. In this manner, turbocharger boost is limited to inhibit increased engine knock, which would otherwise result from increased boost. Additionally, spark retard authority is maintained at usable levels.

The turbocharged engine knock control monitors engine operating parameters including, but not limited to, $T_{IA}$, MAP, $T_{ENG}$, $C_{KNOCK}$ and RPM. A base spark timing is determined based on MAP and RPM. For example, the base spark timing can be determined from a look-up table based on MAP and RPM. A retarded spark timing is subsequently determined based on the octane scalar.

Although a brief description of calculation of the octane scalar is provided herein, a more detailed description is provided in U.S. Pat. No. 5,560,337, described above. The octane scalar is determined as the ratio between a numerator value (NUM) and a denominator value (DENOM). NUM and DENOM are determined based on a plurality of membership functions that are consistent with fuzzy logic control, wherein the above-described operating parameters are sub-divided into a plurality of categories. For example, $T_{ENG}$ is subdivided into the categories of low temp, high temp and not low temp, MAP is subdivided into low pressure and high pressure, and RPM is sub-divided into low speed and high speed.

The membership functions are applied to a knowledge rule base to determine a set of associated truths after determining membership function output values. The rules forming the rule base are determined in an analysis of the impact of the membership functions on engine knock propensity. After determining the truths, NUM and DENOM are used to compute the octane scalar. More specifically, the octane scalar is computed as a weighted sum of NUM and DENOM, each of which is summed over each truth. NUM and DENOM are calculated based on the following equations:

NUM=NUM+TRUTH($n$)*POS($n$)*WEIGHT($n$)

DENOM=DENOM+TRUTH($n$)*WEIGHT($n$)

where n is the truth number, POS is a position value and WEIGHT is a weighting value. The position values may be determined in a calibration step as the extent that the associated truth indicates engine knock propensity. The weight values are used to weight the truths with respect to each other, to reflect any variance in the degree by which the rules indicate a knock propensity.

Figure 2:
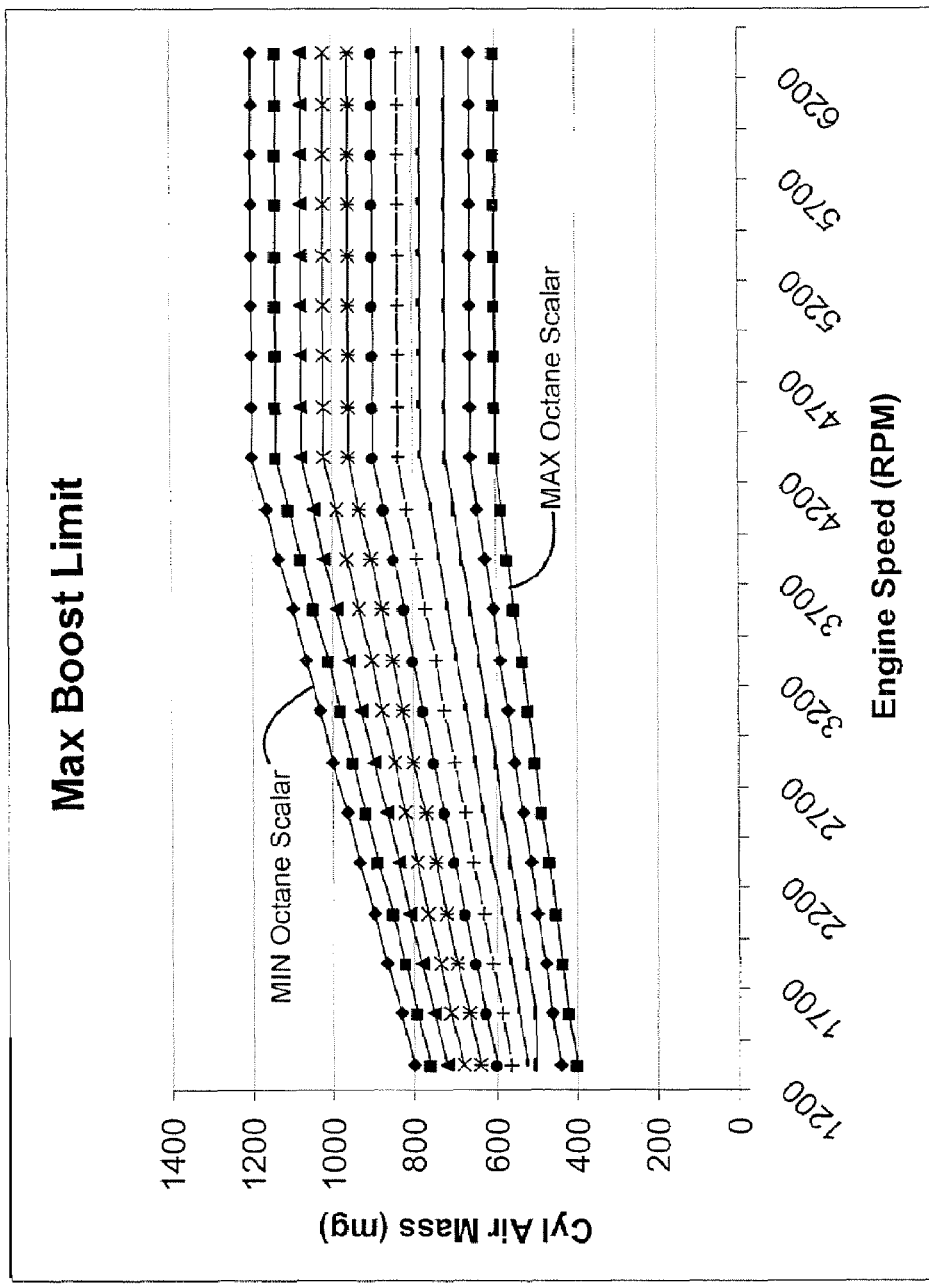
FIG. 2 is a graph illustrating exemplary cylinder mass air limit traces based on octane scalar values and engine RPM.

Once the octane scalar is calculated for a particular cylinder, the retarded spark timing is determined for that cylinder based thereon. Further, the turbocharged engine spark control determines a cylinder air mass limit as a function of the maximum octane scalar value for each of the cylinders and the engine RPM. More specifically, a look-up table can be implemented using the maximum octane scalar value and engine RPM as inputs. The graph of FIG. 2 illustrates exemplary cylinder mass air limit traces based on the octane scalar value and the engine RPM. The boost provided by the turbocharger 20 is limited based on the cylinder air mass limit. In this manner, the pressure decreases the propensity for engine knock thereby reducing the need to retard the spark timing.

Figure 3:
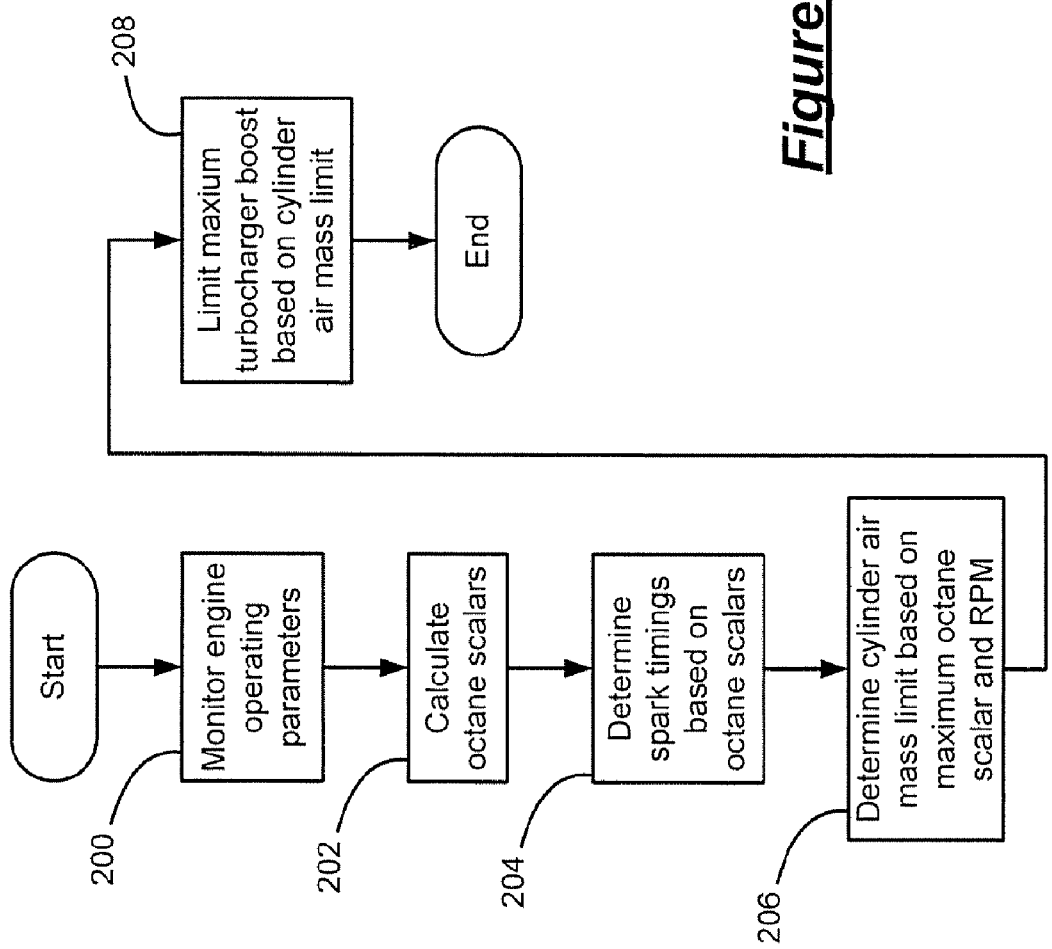
FIG. 3 is a flowchart illustrating exemplary steps executed by the turbocharged engine knock control of the present invention.

Referring now to FIG. 3, exemplary steps executed by the turbocharged engine knock control will be described in detail. In step 200, control monitors the engine operating parameters including, but not limited to, $T_{IA}$, MAP, $T_{ENG}$, $C_{KNOCK}$ and RPM. In step 202, control calculates the octane scalar for each cylinder. Control determines the spark timing for each cylinder based on its corresponding octane scalar in step 204. In step 206, control determines the cylinder mass air limit based on the maximum octane scalar value and the engine RPM. In step 208, control limits the maximum turbocharger boost based on the cylinder air mass limit and control ends.

Figure 4:
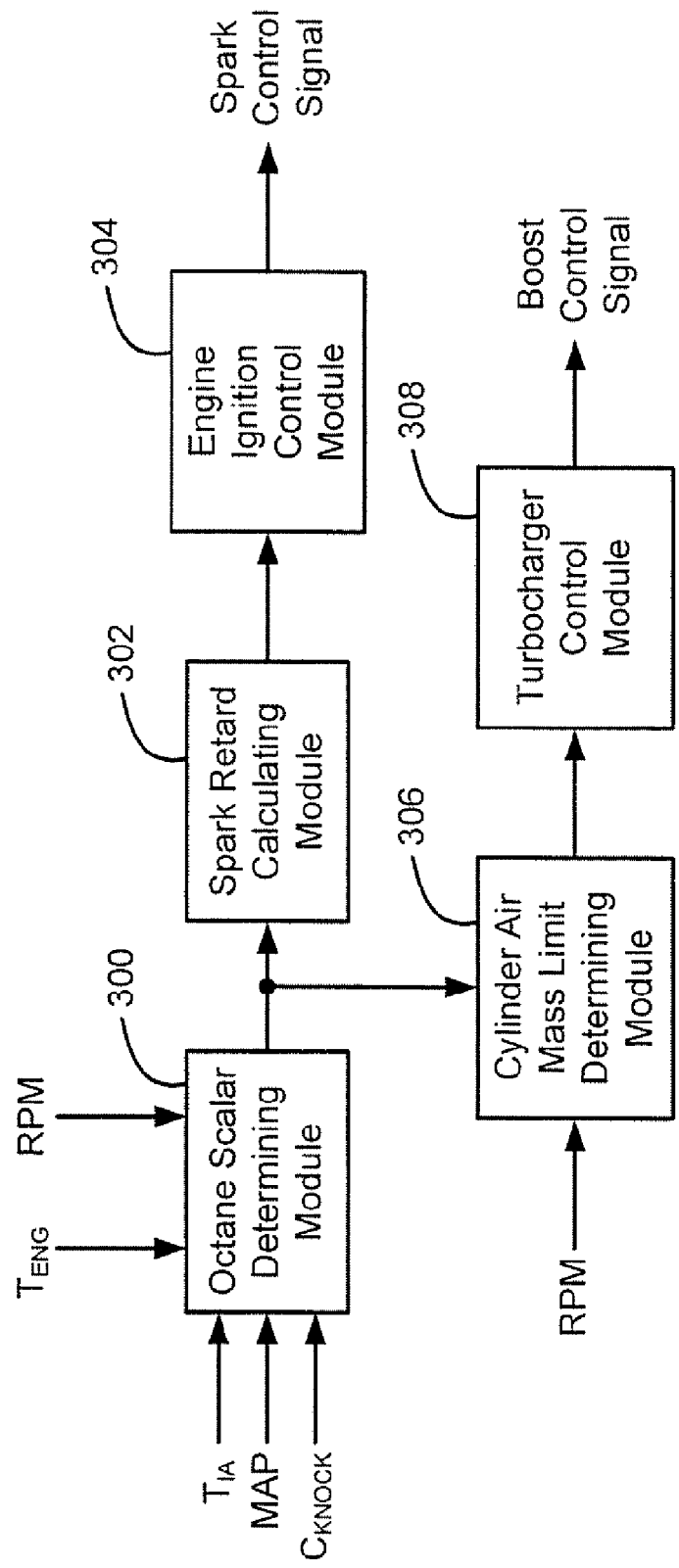
FIG. 4 is a functional block diagram of exemplary modules that execute the turbocharged engine knock control of the present invention.

Referring now to FIG. 4, exemplary modules that execute the turbocharged engine knock control will be described in detail. The exemplary modules include an octane scalar determining module 300, a spark retard calculating module 302, an engine ignition control module 304, a cylinder air mass limit determining module 306 and a turbocharger control module 308. The octane scalar determining module 300 determines the octane scalar based on $T_{IA}$, MAP, $T_{ENG}$, $C_{KNOCK}$ and RPM. The spark retard calculating module 302 determines the amount of spark retard based on the octane scalar and the engine ignition control module 304 generates a spark control signal based on the amount of spark retard.

The cylinder air mass limit determining module 306 determines the cylinder mass air limit based on the octane scalar and the engine RPM. The turbocharger control module 308 generates a boost control signal based on the cylinder air limit. More specifically, the waste gate 28 is actuated based on the boost control signal to limit the boost output of the turbocharger to the cylinder mass air limit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An engine knock control system for an engine including a turbocharger, comprising:
    a first module that determines octane scalars indicative of an engine knock propensity for each cylinder of said engine system;
    a second module that determines a cylinder air mass limit based on said octane scalars; and
    a third module that limits a boost output of said turbocharger based on said cylinder air mass limit.

2. The engine knock control system of claim 1 wherein said cylinder air mass limit is determined based on a maximum of said octane scalars.

3. The engine knock control system of claim 1 wherein said cylinder air mass limit is further determined based on an engine RPM.

4. The engine knock control system of claim 1 further comprising a fourth module that determines a spark retard for each cylinder respectively based on said octane scalars.

5. The engine knock control system of claim 1 wherein said third module limits a boost output of said turbocharger by actuating a waste gate valve to selectively detour an exhaust gas from entering said turbocharger.

6. A method of controlling engine knock in an engine system including a turbocharger, comprising:
    determining octane scalars indicative of an engine knock propensity for each cylinder of said engine system;
    determining a cylinder air mass limit based on said octane scalars; and
    limiting a boost output of said turbocharger based on said cylinder air mass limit.

7. The method of claim 6 wherein said cylinder air mass limit is determined based on a maximum of said octane scalars.

8. The method of claim 6 wherein said cylinder air mass limit is further determined based on an engine RPM.

9. The method of claim 6 further comprising determining a spark retard for each cylinder respectively based on said octane scalars.

10. The method of claim 6 wherein said step of limiting a boost output of said turbocharger includes actuating a waste gate valve to selectively detour an exhaust gas from entering said turbocharger.

11. A method of controlling engine knock in an engine system including a turbocharger, comprising:
    monitoring engine operating parameters;
    determining octane scalars indicative of an engine knock propensity for each cylinder of said engine system based on said engine operating parameters;
    determining a cylinder air mass limit based on said octane scalars;
    adjusting a spark timing to mitigate engine knock; and
    limiting a boost output of said turbocharger based on said cylinder air mass limit.

12. The method of claim 11 wherein said cylinder air mass limit is determined based on a maximum of said octane scalars.

13. The method of claim 11 wherein said cylinder air mass limit is further determined based on an engine RPM.

14. The method of claim 11 said step of adjusting a spark timing comprises determining a spark retard for each cylinder respectively based on said octane scalars.

15. The method of claim 11 wherein said step of limiting a boost output of said turbocharger includes actuating a waste gate valve to selectively detour an exhaust gas from entering said turbocharger.

* * * * *